March 6, 1956 — KIYO TOMIYASU — 2,737,633
WAVE GUIDE FOR ROTARY JOINT SYSTEM
Filed Jan. 25, 1951 — 5 Sheets-Sheet 1

INVENTOR
KIYO TOMIYASU
BY Thomas M. Ferrill, Jr.
ATTORNEY

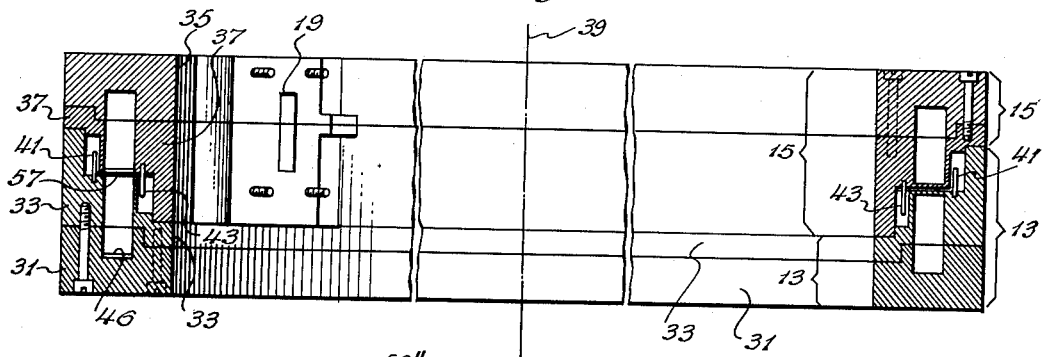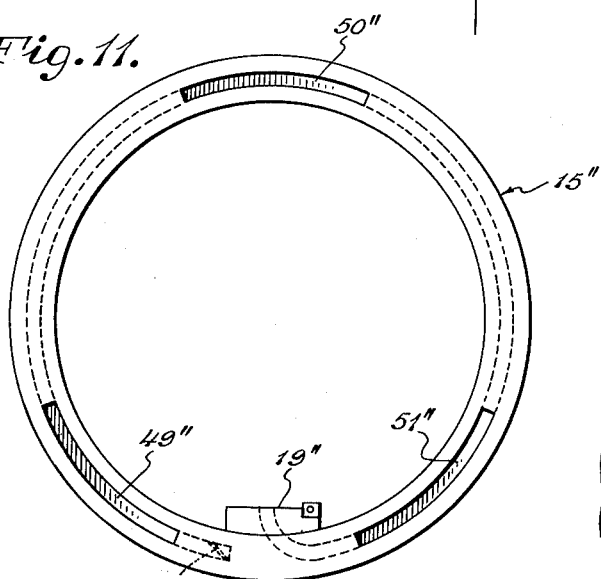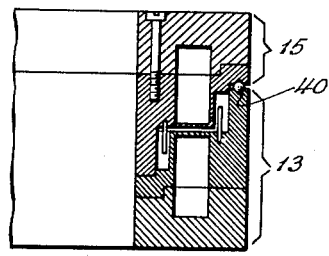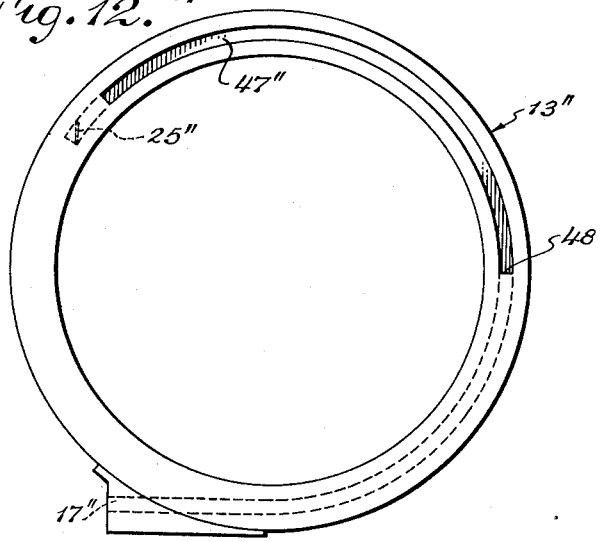

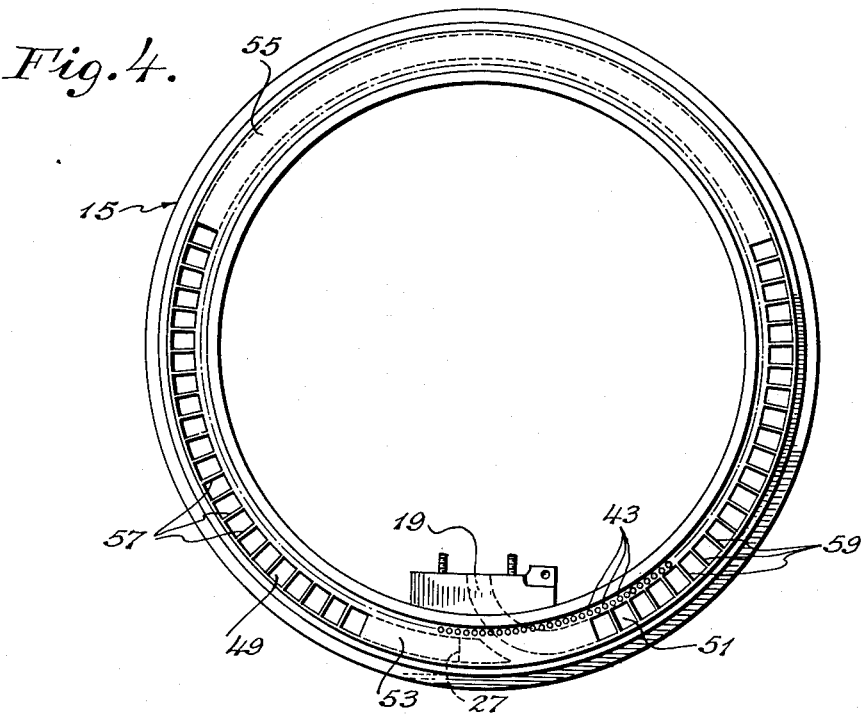
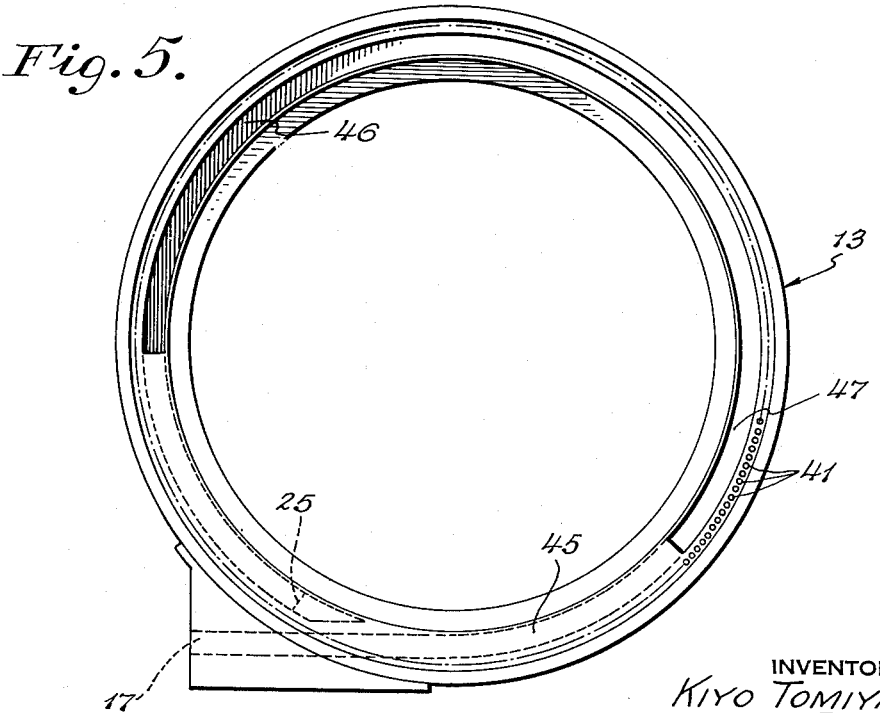

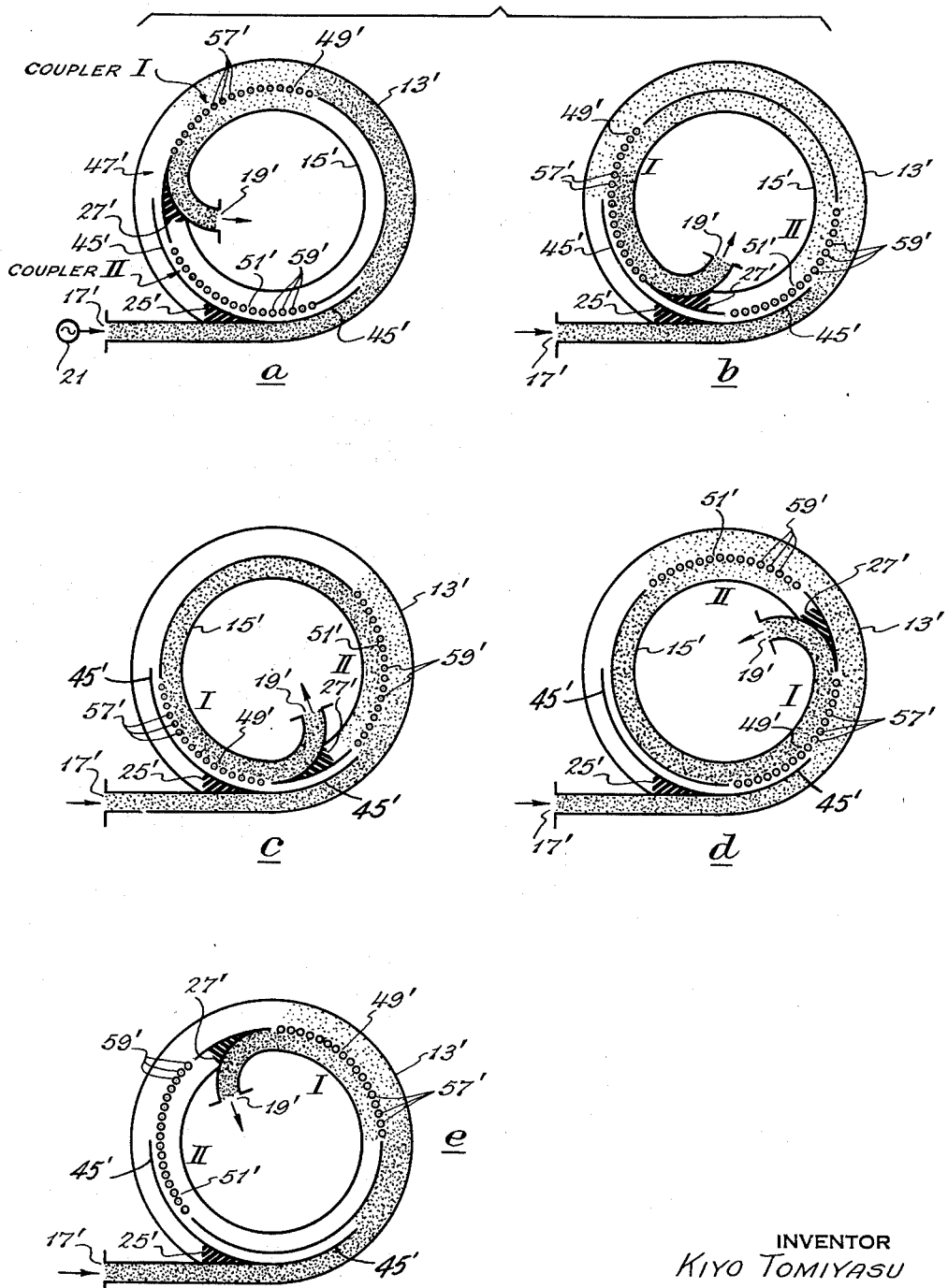

March 6, 1956

KIYO TOMIYASU 2,737,633

WAVE GUIDE FOR ROTARY JOINT SYSTEM

Filed Jan. 25, 1951

INVENTOR
*KIYO TOMIYASU*
BY
*Thomas M. Ferrill, Jr.*
ATTORNEY

United States Patent Office 2,737,633
Patented Mar. 6, 1956

2,737,633
WAVE GUIDE ROTARY JOINT SYSTEM

Kiyo Tomiyasu, Flushing, N. Y., assignor to Sperry Rand Corporation, a corporation of Delaware Application January 25, 1951, Serial No. 207,700

15 Claims. (Cl. 333—98)

The present invention relates to microwave energy guiding or conveying systems, and is particularly concerned with a structure for intercoupling two wave guides between which relative rotation is required.

An important object is to provide an improved rotary joint system of high efficiency and high power transmission capacity, with broad-band frequency response characteristics, and with freedom from excessive energy reflection, these properties being substantially maintained within reasonable limits throughout the full 360° angular range.

Another major object is to provide a rotary joint system so constructed that a series of the systems may be aligned along a common axis and employed for conveying energies along multiple paths, each involving relative rotation between two wave guides.

A further object is to provide a rotary joint system so constructed as to enable a directive antenna such as a radar antenna to be revolved without limits about a mast, the antenna at all angular positions being efficiently coupled to the associated transmitting and/or receiving equipment.

These and other objects and advantages are achieved in the present invention by the provision of a rotary joint system consisting of first and second relatively rotatable ring units, each comprising an arcuate wave guide of generally annular configuration, the wave guide path in each ring unit being less than a complete circle. The two wave guides are so juxtaposed and intercoupled as to provide energy transmission through an arcuate path in a first one of the rings, and thence a distributed coupling from the first ring to the second wave guide unit, the initial direction of angular progression of the energy being maintained throughout, and the energy proceeding onward through an arcuate path in the second wave guide to the point of emergence therefrom.

The arrangement of the parts of the system will be more fully explained below with reference to the accompanying drawings, wherein:

Fig. 3 is a cross-sectional view taken on the line III—III in Fig. 2;

Figs. 4 and 5 are views respectively of the upper and lower ring portions of the rotary joint system of Figs. 1–3, the upper ring (Fig. 5) having been lifted off and turned back in the same sense as the opening of a hinge;

Fig. 6 is a fragmentary cross-sectional view showing a modification of the invention wherein ball bearings are provided between the relatively rotatable ring units;

Fig. 7 is a series of diagrams schematically indicating the manner in which the energy transfer action is effected through the coupler at various angular positions of the two ring elements;

Figure 8:
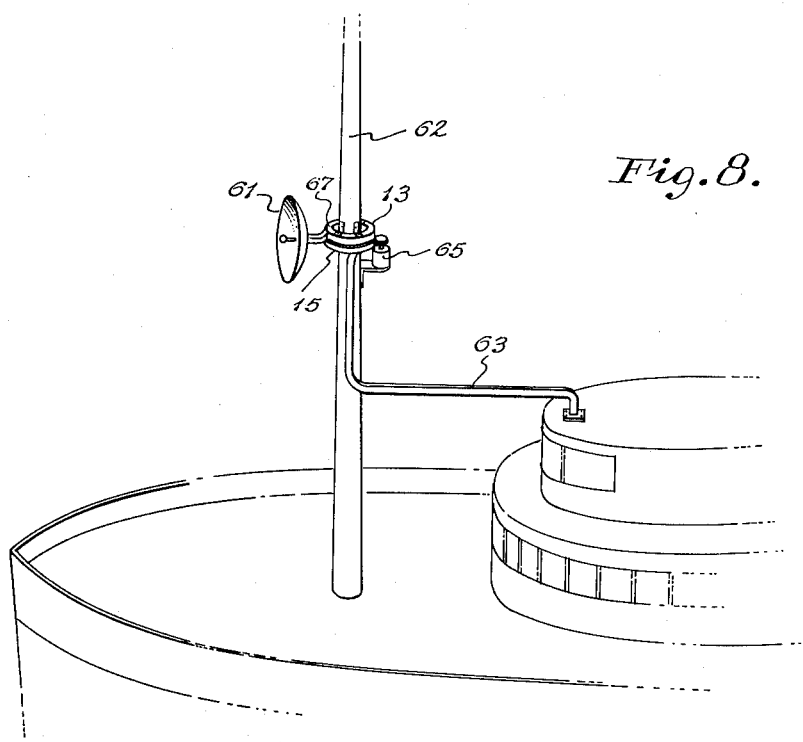
Figure 9:
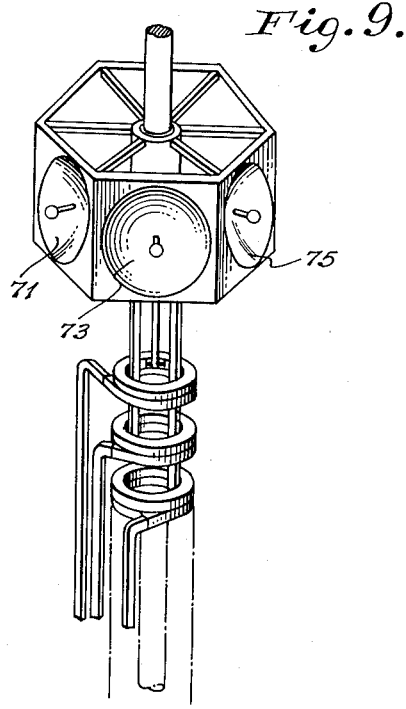
Figure 10:
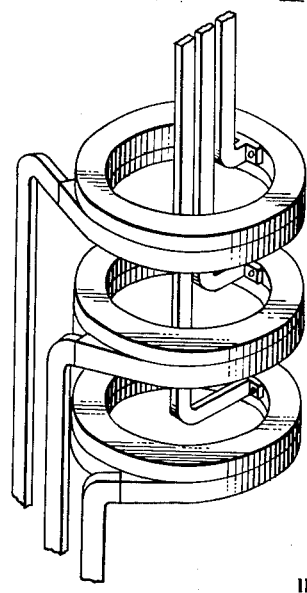

Figs. 8, 9 and 10 are drawings showing various wave guide energy transmission arrangements wherein the special properties of the present directional coupler system are advantageously employed; and Figs. 11 and 12 are views of the upper and lower wave guide ring portions of a rotary joint system involving three coupling openings in one ring, these views being taken as though the rings have been taken apart and opened outward in hinge-fashion.

Figure 1:
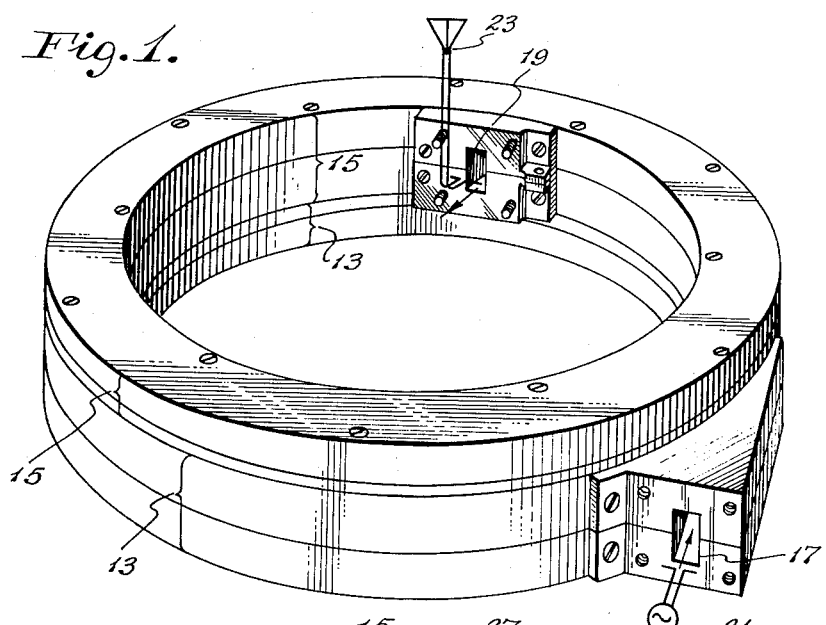
Fig. 1 is a perspective view of a rotary joint energy coupler embodiment.

Fig. 1 shows a rotary joint system including a lower ring wave guide portion 13 and an upper ring wave guide portion 15 fitted together and arranged for relative rotation. The lower wave guide portion 13 is provided with a substantially tangentially-directed external energy coupling end 17, and the upper ring wave guide unit is provided with a substantially radially directed inner wave guide end 19.

This rotary joint system 13, 15 may be provided for receiving energy from a source 21 and conveying it to a load such as an antenna system 23, and/or for conveying energy from a device such as antenna 23 to a receiving equipment coupled to the opposite external connection of the rotary joint system, i. e., wave guide end 17.

Figure 2:
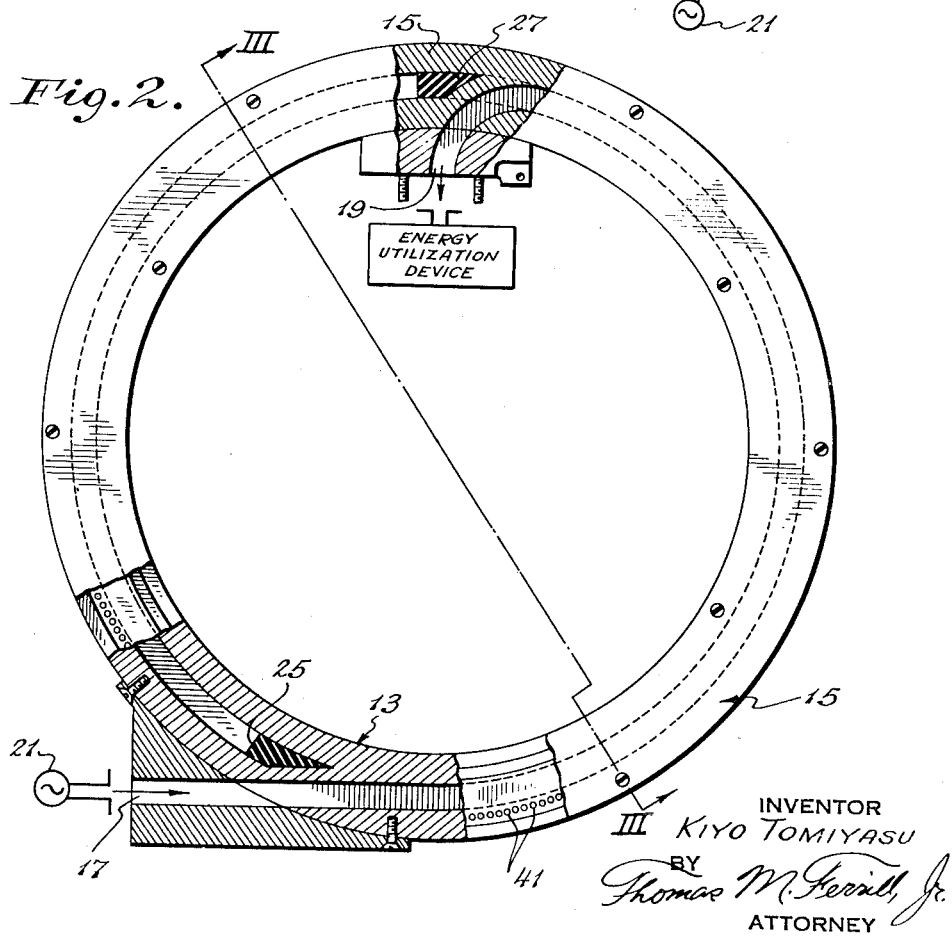
Fig. 2 is a plan view of the structure shown in Fig. 1, with portions of the first and second wave guide rings being shown in section.

The internal arrangement of the relatively rotatable wave guide ring units of Fig. 1 is illustrated in Figs. 2, 3, 4 and 5. Fig. 2 is a plan view of the coupler system, a portion of the lower wave guide ring unit 13 being shown in section in the region of the external connection end 17, and a portion of the upper wave guide ring unit 15 being shown in section in the region of the external connection end 19 thereof.

A terminating resistor or energy absorbing unit 25 is provided in the end of the lower wave guide opposite from end 17, so that any energy which passes substantially through the complete circuit of wave guide 13 is absorbed in unit 25. Similarly a terminating resistor 27 is provided in the end of the wave guide 15 opposite from the external connection end 19 thereof.

Fig. 3 shows the cross-sectional configuration of the ring wave guide units 13 and 15, this view being taken on the line III—III in Fig. 2, showing how each of the wave guide rings is made up as a subassembly of two ring elements, for manufacturing convenience.

The lower wave guide ring unit 13 comprises ring portions 31 and 33, and the upper wave guide ring unit 15 comprises portions 35 and 37. These may be machined from aluminum stock, and where desired, the principal electric current conduction surfaces may be copper plated.

As is apparent in the cross-sectional view of Fig. 3, the wave guides have their narrow transverse dimensions substantially radially directed, and their broader "a" dimensions directed longitudinally, parallel to the axis 39 of relative rotation of the system.

As is further apparent in Figs. 3, 4 and 5, a first serrated choke 41 surrounds the space between the lower and upper wave guides, and a second serrated choke 43 of diameter slightly less than the minimum diameter of the wave guide rings is positioned within the system. In the illustrated structure, the serrated chokes 41 and 43 are made up as individual pins of conductive material, having substantially one-fourth wavelength projection beyond their bored seats, the pins being positioned very close to the outside walls of the wave guides.

These serrated chokes serve the dual purposes of preventing escape of energy between the upper and lower ring units, and also providing effective short circuiting action between the adjacent edges of the conductive walls of the wave guides. Also, they effectively inhibit any circumferential energy propagation external of the wave guides. Thus, the effect of employment of the serrated chokes is substantially the same as though perfect pressure contact were provided between the upper and lower wave guides, but the attendant excessive friction is avoided.

The features of the serrated chokes per se are described and claimed in my copending application Serial No. 197,063, filed November 22, 1950.

Referring now particularly to Figs. 4 and 5, the respective upper and lower wave guide ring portions 15 and 13 are shown in Figs. 4 and 5 respectively, the view of each of these major elements of the invention being directed toward the surface which normally is adjacent the opposite major element. In Fig. 4, it will be seen that the inner choke system 43 comprises a series of pins, which, for convenience are positioned at 1° intervals, and in Fig. 5 the pins of the outer serrated choke 41 are similarly positioned at 1° intervals for manufacturing convenience. The diameters and spacing of the pins may be chosen within reasonably wide limits.

The wave guide ring unit 13 in Fig. 5 includes an almost complete annular wave guide path, extending from external connection end 17 in the counterclockwise direction as viewed in Fig. 5, around to a termination end located close to the input end, as shown in section in Fig. 2. The external connection end and the termination end of the annular wave guide section are fully enclosed, one narrow wall 45 extending over these portions of the wave guide and being arranged substantially like an arcuate shutter. Throughout a major portion of the wave guide circuit, intermediate the external connection end and the termination end, there is provided an arcuate opening 47 through which energy communication with the upper wave guide ring is to be effected.

In this illustrative embodiment of the invention, the extent of opening 47 is 225°, the remaining 135° being occupied by the barrier 45, under which lie the termination end and the external connection end of the annular wave guide path in unit 13. An arcuate plate 46 of substantially 225° extent, of width conformal to the internal cross-dimension of the wave guide in unit 13 and of thickness substantially equal to or very slightly thicker than the thickness of the wave guide wall portions of barrier 45 is seated in the bottom of the wave guide directly beneath the arcuate opening 47, to prevent energy reflections from the regions of the ends of the arcuate opening 47, and to maintain uniformity of the phase velocity of energy propagation throughout the wave guide of unit 13.

In the upper wave guide ring unit 15 shown in Fig. 4, two elongated arcuate openings 49 and 51 are provided, situated asymmetrically in the ring unit. Arcuate walls 53 and 55 of unequal lengths separate the elongated arcuate openings 49 and 51. Wall 55 provides complete enclosure of the annular wave guide path portion connecting the wave guide sections which are open at 49 and 51. A portion of the shorter arcuate wall 53 encloses the termination end of the incomplete annular wave guide path in unit 15, and an opposite portion of wall 53 encloses the sharply curved wave guide end section arranged for external connection, through coupling means to be attached at end 19.

The elongated arcuate openings 49 and 51 are shown provided with cross bars as typified by cross bars 57 in opening 49 and cross bars 59 in opening 51. These elongated openings 49 and 51 are designed for intercoupling of microwave energy between the wave guides of units 13 and 15, according to the principles of the variable transfer directional coupler system described and claimed in copending application Serial No. 197,064, filed November 22, 1950, in the names of Kiyo Tomiyasu and Seymour B. Cohn. Each of these openings 49 and 51 has the required relationship between its length (the number and sizes of cross bars therein being taken into account) and the internal wave guide dimensions to provide for complete power transfer from one guide to the other when the opening (49 or 51) is in full register with the opening 47 in wave guide 13.

The mating faces of the lower and upper wave guide ring units 13 and 15, respectively, are machined with mating shoulders therein, so arranged as to provide appreciable spaces enclosing the respective serrated chokes 41 and 43, and also to provide suitable thrust and radial bearing surfaces for the wave guide ring units, insuring accurate registry of the axes of the ring units and also insuring maintenance of the desired minute spacing between the wave guide conductive wall surface. The arrangement of the shoulders in the relatively movable surfaces is clearly apparent in the cross sectional view in Fig. 3.

As illustrated in Fig. 6, if desired, a ball bearing race may be provided for avoiding excessive friction between the lower and upper wave guide rings, and for acting along with the radial pressure shoulders to retain the desired precise alignment of the lower and upper wave guide ring units. A relatively large number of hardened steel balls may be provided in the ball race between the lower and upper rings, so that such axial forces as are relied upon to retain the two rings together are evenly distributed around the rings.

In the present application, no specific structure is shown for clamping the two rings together while permitting relative rotation therebetween, since in some applications at fixed locations, they rest in proper contact by force of gravity. It will be readily apparent, however, that one of the rings may be rigidly mounted on a craft and the other ring may be retained under pressure by a suitable well known mechanical thrust bearing system.

In patent application Serial No. 197,064, referred to above, the operation of the variable transfer coupler system involves the consideration of two modes of wave energy propagation which prevail within the mutually adjacent wave guide portions whose interiors are exposed to each other through the longitudinally extensive openings in the respective guides. It is customary to design a rectangular wave guide for efficient transmission of energy of a known frequency, the mode of transmission being a fundamental mode of the guide usually referred to as the $TE_{1,0}$ mode. This is the dominant transverse electric mode. The "$a$" dimension of the simple rectangular wave guide ordinarily is such as to prevent it from transmitting energy of this frequency in any of the known higher modes.

When two of such wave guides are juxtaposed with their narrower faces mutually adjacent, and the adjacent narrower walls are opened throughout an appreciable longitudinal extent, the effect is to substantially double the "$a$" dimension of the wave guide portion. This wave guide portion is then capable of supporting energy in two modes of propagation, the first being closely related to the simple transverse electric mode $TE_{1,0}$ described in connection with the basic wave guide section, and the second mode being the "asymmetrical" mode designated $TE_{2,0}$. Such inductive loading as is effected by the crossbars brings about the departure of the symmetrical mode from the normal character of a $TE_{1,0}$ mode energy distribution in the enlarged wave guide section.

These two modes are propagated along the doubled wave guide section at different phase velocities. At the point of entrance of the energy into the doubled wave guide section, they are in phase in the lower guide (in ring unit 13), assuming this guide supplied with energy at its left-hand end, at 17. At the point of entrance into the doubled wave guide section, these components are in phase opposition in the upper wave guide. Farther along the doubled wave guide section, however, the two components approach cophasality in the upper guide, even as they approach phase opposition in the lower guide. If the openings are of sufficient length and are in full register, complete energy transfer takes place from the lower guide to the upper guide, with unidirectional propagation being maintained, away from the source.

For a position of intermediate register, a partial transfer of the energy to the upper guide takes place, so that an output power division between the upper and lower guides is accomplished, with the directional coupler feature being retained. The power transfer to the upper guide varies with the extent of register between the openings as a sine squared function.

As further explained in patent application Serial No. 197,064, where cross-bars are used generally in the manner as illustrated in Fig. 4 at 57 and 59, the cross bars being spaced apart and arranged across the longitudinal opening in one of the wave guides, the operating characteristics of the variable transfer directional coupler are greatly improved, with appreciably extended length thereof for a given wavelength and a given set of internal dimensions of the wave guide, and with enhanced discrimination against any energy transmission in the reverse direction.

The cross-bars 57, 59 may be omitted from the openings, in which case the openings will have appreciably smaller angular extent (approximately ⅓ the arc length of the openings shown in the embodiment of Figs. 2–5) for complete energy transfer. However, the use of the cross-bars and the accompanying provision of the greater length of the arcuate openings is generally preferable.

The openings 49 and 51 in wave guide ring unit 15 are each of approximately 90° angular extent in the unit illustrated, although this angular extent may be greater or less, so long as the overall length of each of the two variable transfer directional coupler openings 49 and 51 is the length in which complete energy transfer from one wave guide to the other is accomplished.

In Fig. 7 are provided a series of schematic diagrams, denoted a, b, c, d and e, respectively, indicating the variations occurring in the manner of energy transfer from one ring unit to the other for various relative angular positions of the two wave guide rings. In these schematic diagrams, one unit appears as though arranged coaxially within the other unit, as distinguished from the axial alignment of two ring units 13, 15 of equal diameters as illustrated in Figs. 1–5. This is primarily for the purpose of clarity of illustration, although a rotary joint system employing the principles of the present invention may be constructed with inner and outer wave guide ring units, provided that the wave guide dimensions in the inner ring are made different from those in the outer ring to such an extent as to provide equal angular phase velocities in the wave guides taken with reference to the progress of the waves around the axis 39 (Fig. 3) of the system.

Referring especially to Fig. 7a, the energy from the source 21 may enter wave guide ring 13' through the end 17' thereof, to progress in the counterclockwise direction therein. As coupler I involving elongated opening 49' is adjacent the opening 47' of wave guide ring 13', coupler I is fully open so that the energy proceeding counterclockwise around wave guide 13' is substantially totally transferred into wave guide 15', the counterclockwise direction being maintained by the distributed transfer directional properties of the coupler, and accordingly, substantially the entire energy proceeds outward through external coupling end 19' of wave guide 15'.

Substantially zero energy passes beyond transfer directional coupler I in wave guide 13', but the dissipative termination 25' stands ready to receive any minute amount of energy which fails to be transferred and to prevent it from being reflected back into the system. Similarly, because of the highly selective directional properties of the variable transfer directional coupler, substantially all of the energy transferred into wave guide 15' travels on in the clockwise direction toward the opening 19', but any minute component energy propagation set up in the opposite direction in wave guide 15' is dissipated in dissipator 27'.

The operation with the relative positions illustrated in Fig. 7c is substantially identical to that described for Fig. 7a, in the sense that a single transfer directional coupler is in the fully opened condition, the other transfer directional coupler being entirely closed. In Fig. 7c, the entire energy supplied to wave guide 13' through the external connection end 17' is directionally transferred through coupler II (opening 51') into wave guide 15', to proceed therethrough in the counterclockwise direction and to be delivered through the external connection end 19' thereof.

The operation in Fig. 7e is somewhat like that in Figs. 7a and 7c, to the extent that a single complete directional energy transfer is involved (through coupler I). However, in Fig. 7e, the other transfer directional coupler is partly open. The energy entering through the input end 17' of wave guide 13' proceeds counterclockwise therein to elongated energy transfer opening 49' which, being entirely away from the barrier 45', provides substantially complete directional energy transfer from wave guide 13' to wave guide 15', the energy proceeding thence counterclockwise to exit through external connection end 19'.

Any minute energy component which may pass beyond coupler I in wave guide 13' proceeds around to coupler II which is partly open, part of this substantially inconsequential energy component proceeding onward to be dissipated in dissipator 25' and the other part thereof being transferred to wave guide 15' and being directionally propagated to join with the energy components transferred at coupler I from wave guide 13' to wave guide 15'. Such energy components, however, are substantially negligible, and do not interfere with the operation of the system.

In the relative angular situation illustrated in Fig. 7b, both openings 49' and 51' of wave guide 15' are partially shuttered by the barrier 45'. Accordingly, only partial energy transfers can take place at these positions. Because of the effective equality of the lengths of the transmission paths from coupler II (involving opening 51') in the counterclockwise direction, around to coupler I (involving opening 49'), the transfer effects of these two partially open couplers are directly additive. Accordingly, the energy which was introduced through the external connection end 17' of wave guide 13' is partly diverted into wave guide 15' at coupler II, so that counterclockwise propagation of the energy in two separate components is provided in the respective portions of wave guides 13' and 15' beyond coupler II. These components, with their relative phases fully maintained, enter a further transfer directional coupling region I, where the energy transfer from wave guide 13' to wave guide 15' is completed, with the counterclockwise propagation direction being maintained throughout. Thus, in this situation, the operation may be considered to be that of one complete transfer directional coupler, since the interruption into two separate guides is inconsequential.

It is the situation illustrated in Fig. 7b which requires that the lengths of the arcuate wave guide portions 13' and 15' between the directional coupler sections be either physically equal with equal internal wave guide configurations, or be effectively equal where one of the wave guides is curved along an arc of smaller radius, the longitudinal phase velocity in the outer wave guide being made proportionately greater so that from the standpoint of angular progression about axis 39, the phase velocities are equal.

In the situation illustrated in Fig. 7d, partial energy transfer occurs at coupler I, but because of the partial closure of coupler I by barrier 45', an appreciable part of the input energy is made to proceed onward in the counterclockwise direction around wave guide 13'. This energy is entirely transferred through directional coupler II involving opening 51', and is thence made to proceed counterclockwise around wave guide 15'. Depending upon the relative phase between this energy and the energy component being supplied one round trip later through external connection end 17' and initially emerging into the region of transfer directional coupler I, some portion of this energy in 15' is made to add to the energy transferred across from wave guide 13' and to proceed forthwith through the external connection end 19' of wave guide 15'.

Some part of the energy which has already made one circular passage in the counterclockwise direction, arriving at coupler I through wave guide 15', is transferred into wave guide 13', to make a further circuit in the counterclockwise direction, through opening 51'. Eventually, because of the characteristics of the couplers I and II and because of the very low attenuation of energy proceeding through the wave guide units, the energy supplied to wave guide 13' through end 17' thereof must ultimately emerge through the end 19' of wave guide 15', with negligible energy loss in the attenuating ends 25', 27'.

In all of the foregoing explanation, the energy has been assumed as supplied to the rotary joint system 13', 15' through the external connection end 17' of wave guide ring 13', the propagation accordingly being initially counterclockwise, and this direction being maintained throughout by the directional action of the transfer directional couplers, substantially all of the supplied energy ultimately emerging from the rotary joint system through the external connection end 19' of wave guide ring unit 15'. As will be apparent, however, the device is entirely bilateral in its operation. Energy supplied thereto through the end 19' of wave guide 15' proceeds clockwise through an arcuate path therein, is directionally transferred to wave guide 13', and continues in the clockwise direction, ultimately emerging through external connection end 17' thereof.

Figs. 8, 9 and 10 illustrate some of the applications for which the present invention is particularly suited. Fig. 8 is an illustration of a microwave directive antenna as employed in a marine radar system, the antenna system 61 being made to revolve about the axis of the mast 62 by which it is supported. In this instance, the coupler system is shown as inverted from its position as shown in Fig. 1, the radar transmitter output coupled thereto through feed wave guide 63 being supplied to the inner wave guide end 19 (Figs. 1 and 2), and the antenna 61 being coupled to the outer wave guide end 17—the external connection end of wave guide ring unit 13.

Motor means 65 may be geared to the ring which is coupled to the antenna, for driving these elements in rotation about the axis of the mast. A direct friction plate 67 may be supported on the mast to bear downward on ring unit 13, or ball bearings or rollers may be provided for this purpose.

With this arrangement, the requirement of a massive bracket extending an appreciable distance forward from the mast and supporting a pivotal bearing for the antenna at such an appreciable distance is avoided. Furthermore, by virtue of the revolution of the antenna about the axis of the mast rather than about an axis displaced forward from the mast, the disturbing effects of the mast being in front of the antenna during the passage of the antenna through the rearward-aiming direction of its circuit are avoided.

Furthermore, if it is desired to have a plurality of radar units carried by the same mast, one or more further feed lines may be installed along the mast 62, in the clearance space between the mast and the rotary joint system coupled to antenna 61, and one or more further rotary joint systems may be provided at other levels on the mast, providing for rotation of further antennas, independently of the rotation of antenna 61, or in fixed angular relation thereto, as desired.

Fig. 9 shows how several antennas, such as antennas 71, 73, and 75, may be arranged in a framework to be rotated as a body, with different horizontal aiming directions and/or different angles of elevation of aiming of the antennas. A plurality of rotary joint units, each conforming to the principles of the present invention are arranged beneath the antenna system for coupling individual antennas to respective ones of a plurality of fixed feed lines. In this arrangement, the fixed feed lines are illustrated as connected to the outer end couplings of the rotary joints, and the antennas are illustrated as coupled through their wave guides to the inner end couplers of the respective rotary wave guide joints.

Fig. 10 illustrates the alignment of a plurality of rotary joint systems according to the present invention along a common axis, with a plurality of inner wave guide output elements spaced progressively from the common axis. With such an arrangement as illustrated in Fig. 10, a plurality of the rotary joints may supply their output components to independently rotatable devices, the limit on the number of rotary joint units for independent rotation in this particular configuration being determined by the inside diameters of the joint systems and the outside dimensions of the wave guides.

In the rotary joint system of Figs. 2–7, two transfer directional coupler sections have been involved. A greater number of transfer directional coupler sections may be used if desired, as for example, where larger inner and outer diameters are to be provided in the rotary joint system. Figs. 11 and 12 schematically indicate the provision of three openings in one of the wave guide ring units 15'', these openings being illustrated as of 45° angular extent, and the intervals between the openings being 45° between openings 49'' and 51'', and 90° between opening 50'' and each of the other two transfer directional coupler openings.

The arcuate opening 47'' in wave guide ring unit 13'' is 135° in this instance, so that unit 13'' effects a closure over an angular extent of 225° of the unit 15'' illustrated in Fig. 11.

As is strikingly shown in Fig. 12, the length of the transmission path beyond the ends of the opening 47'' is substantially immaterial, and the resistance termination 25'' may be located near the end of the opening 27''—it need not be located immediately adjacent to the external connection end 17'' of the wave guide. Although wave guide end 17'' is indicated as located an appreciable distance from end 48 of slot 47'', this distance is not necessary; it being sufficient for good performance of the system for the end 17'' to be located a very short distance beyond the end 48 of the coupling opening 47''. Thus, in the structure of Fig. 12, the extent of the wave guide around the ring 13'' may be of the order of one-half the circumference of the unit.

The dissipators 27 and 25 of Fig. 2 are illustrated as massive bodies of lossy dielectric material such as rubber or a suspension of iron particles in an insulating medium. The dissipators may take this form, or may be wave guide resistor card elements, such as are manufactured by International Resistance Company, for example, the character of the end dissipators being relatively unimportant since the proportion of the microwave energy reaching these dissipators is extremely small in all cases.

An illustrative set of dimensions for a rotary joint system for a midband frequency of the order of 10,000 megacycles is given in the following table, as applying to the structure illustrated in the substantially scalar drawings in Figs. 1–5:

Internal cross-sectional dimensions of each wave guide: 0.400 inch x 0.900 inch.
Mean diameter of the wave guide path: 10¾ inches.
Number of cross-bars per coupler opening: 21.
Diameter of cross-bars: 0.036 inch.
Width of openings in both rings: Full width of wave guide (0.400 inch).

By comparison of the structure shown in Figs. 2–5 and schematically indicated in Fig. 7 with the embodiment of Figs. 11 and 12, it will be seen that in each of these cases, the manner of operation involves complete energy transfer through one fully open transfer directional coupler section for certain ranges of the relative angular positions of the two wave guide rings, and for the other angular positions, involves partial energy transfer in a first transfer directional coupler section complemented by a further energy transfer into the second wave guide in a further transfer directional coupler section.

To meet the requirements illustrated in Fig. 7–b, the barrier 45' has an angular extent equal to the angular distance between the midpoints of openings 49' and 51', measured through the dissipator end of wave guide 13'. This satisfies the requirement that for a range of angular positions centered about the position shown in Fig. 7b, the sum of the effective lengths of the complementary couplers II and I remains equal to the length of one of the transfer directional couplers when fully open.

A further requirement as to the geometry of the system is explainable with reference to Fig. 7d, wherein transfer directional coupler section II must be fully open throughout the full range of variation of the extent of partial opening of transfer directional coupler section I. Otherwise, with the energy division occurring between wave guides 13' and 15' for the energy progressing counterclockwise beyond the initially-encountered transfer directional coupler I, the non-transferred component progressing in wave guide 13' would not be totally transferred into wave guide 15' at coupler section II as desired, but instead, a substantial part of this energy would remain in wave guide 13' and would proceed onward in the counterclockwise direction beyond coupler II, to reach dissipator 25' and be wasted therein.

Thus, it is necessary for the angular extent of the opening 47' to be as great as the sum of the angular extents of the two transfer directional coupler openings 49' and 51' plus the angle therebetween wherein is included the termination end 27'.

The present invention is not limited to use in applications of the general class typified by Figs. 8, 9 and 10. Concomitantly with its use as a rotary joint device, or with the rotary joint feature present only as an incidental matter, it may be used basically as a high-efficiency phase shifter, capable of a continuous shift of several hundred degrees per revolution, with continuous revolution available as a means to effect a predetermined maintained unidirectional shift of output frequency.

A phase change per revolution of the order of 8640 degrees may be obtained, with substantial linearity of the phase shift values for small angles. In other words, at the operating frequency for 8640 degrees per revolution, the phase shift for small angular adjustments varies substantially at the rate of 24 degrees electrical phase shift per degree revolution, in the various relative positions of the ring units.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A rotary joint system for microwave energy, comprising first and second wave guides each having a closed end and an open end, each of said wave guides being formed as a ring with the closed end adjacent the open end, said two wave guide rings being juxtaposed for relative rotation therebetween with their axes coincident with the axis of rotation, said first wave guide having at least two elongated openings spaced an appreciable distance apart and adjacent said second wave guide, and said second wave guide having an opening therein adjacent said first wave guide, the angular extent of said opening in said second wave guide about said axis of rotation being as great as the overall angular extent of said two openings in said first wave guide about said axis.

2. A rotary joint system as defined in claim 1, wherein the direction of said first wave guide from its open end to its closed end is opposite to the direction of said second wave guide from its open end to its closed end.

3. A rotary joint system as defined in claim 2, wherein each of said wave guides includes a dissipative termination in its closed end.

4. A rotary joint system as defined in claim 1, wherein said first and second wave guides have equal rectangular cross sections and said first and second wave guide rings are of equal diameters, one narrow wall of said first wave guide being substantially adjacent to a narrow wall of said second wave guide, said first and second wave guides being capable of transmitting energy with transverse electric polarization, the electric vectors being radially directed with respect to said axis of rotation.

5. A rotary joint system as defined in claim 1, wherein a plurality of regularly spaced conductive cross-bars are provided across each of said elongated openings in said first wave guide.

6. A rotary joint system as defined in claim 1, further including an inner circumferential choke and an outer circumferential choke each forming an energy-confining boundary for the space between said wave guides, each of said chokes comprising a series of close-spaced tines attached to one of said wave guides and extending adjacent to the other of said wave guides but spaced slightly therefrom.

7. A rotary joint system for microwave energy, comprising first and second wave guides each formed as a ring with an incomplete annular energy transmission path bounded by a toroidal conductive boundary, each of said wave guides having an energy-communicating end, said two wave guide rings being juxtaposed for relative rotation therebetween about an axis of rotation in alignment with the axes of said two wave guide rings, and means including a first opening in one of said wave guides and a plurality of spaced openings in the other of said wave guides both communicating with said first opening in one relative angular position of said wave guide rings for providing directional energy transfer from the annular transmission path in one of said wave guide rings to the other of said wave guide rings.

8. A rotary joint system as defined in claim 1, wherein the angular extent of said first opening is substantially greater than 180°.

9. A rotary joint system for microwave energy, comprising first and second wave guides each having a closed end and an open end, each of said wave guides being formed as a ring with the closed end adjacent the open end, said two wave guide rings being juxtaposed for relative rotation therebetween with their axes coincident with the axis of rotation, said first wave guide having two elongated openings therein adjacent said second wave guide, said openings each being of substantially 90° angular extent about said axis of rotation and being asymmetrically situated with angles of separation of substantially 45° and substantially 135°, and said second wave guide having one elongated opening therein adjacent said first wave guide, said opening in said second wave guide being of substantially 225° angular extent about said axis of rotation.

10. A rotary joint system for microwave energy, comprising first and second wave guides each having a closed end and an open end, each of said wave guides being formed as a ring with the closed wave guide end adjacent the open end, said two wave guide rings being juxtaposed for relative rotation therebetween with their axes coincident with the axis of rotation, said first wave guide having two substantially equal elongated openings therein adjacent said second wave guide, and said second wave guide having an opening therein adjacent said first wave guide and of extent as great as the sum of the extents of said two substantially equal elongated openings, the direction of said first wave guide from its open to its closed end being opposite to the direction of said second wave guide from its open end to its closed end about said axis.

11. Microwave energy transmission apparatus comprising first and second wave guides each formed as a ring with an incomplete annular energy transmission path bounded by a substantially toroidal conductive boundary of rectangular cross-section, each of said wave guides having an energy communicating end, the broad interior walls of each wave guide being of substantially cylindrical form and the narrow interior walls being substantially planar, said ring wave guides being of equal diameters and being juxtaposed with one narrow planar interior wall of one wave guide adjacent to one narrow planar interior wall of the other wave guide, and means providing directional energy coupling from one of said wave guides into the other whereby wave energy entering said first wave guide through the energy-communicating end thereof proceeds initially in a first direction around the axes of said rings in said first wave guide and is transferred thenceforth into said second wave guide and made to continue in the same direction therein and to proceed thence out through the energy-communicating end of said second wave guide.

12. A rotary joint system for microwave energy, comprising first and second wave guides each formed as a ring with an incomplete annular transmission path, each of said wave guides having an energy communicating end, said two wave guide rings being juxtaposed for relative rotation therebetween about an axis of rotation in alignment with the axes of said two wave guide rings, means providing a plurality of separate distributed couplings between said first and second wave guides, and means varying the coupling distribution between said separate distributed couplings according to the angle of relative rotation between said first and second wave guide rings.

13. A rotary joint system for microwave energy, comprising first and second wave guides each formed as a ring with an incomplete annular transmission path, each of said wave guides having an energy communicating end, said two wave guide rings being juxtaposed for relative rotation therebetween about an axis of rotation in alignment with the axes of said two wave guide rings, means providing a plurality of directional couplers between said first and second wave guides for energy transfer from one of said wave guides to the other, and means for varying the energy coupling distribution among said directional couplers according to relative rotation between said first and second wave guides.

14. A rotary joint system as defined in claim 13, further including an inner circumferential choke and an other circumferential choke each interposed between said first and second wave guides, each of said chokes comprising a series of close-spaced tines attached to one of said wave guides and extending adjacent to the other of said wave guides but free from direct contact therewith.

15. A rotary joint system for microwave energy, comprising first and second hollow conductive wave guides each formed as a ring with an incomplete annular energy transmission path, each of said wave guides having an energy-communicating end, said two wave guide rings being juxtaposed for relative rotation therebetween about an axis of rotation in alignment with the axes of said two wave guide rings, and directional coupling means including an opening in each of the adjacent walls of said first and second hollow conductive wave guide rings for energy transfer between said wave guides.

References Cited in the file of this patent

UNITED STATES PATENTS

| | | |
|---|---|---|
| 2,418,809 | Albersheim | Apr. 15, 1947 |
| 2,568,090 | Riblet | Sept. 18, 1951 |